REMOTE TELEPHONE EXTENSION SYSTEM

Filed March 2, 1964

INVENTOR
Marvin Miller
BY Pennie, Edmonds, Morton, Taylor and Adams
ATTORNEYS

United States Patent Office 3,366,744

Patented Jan. 30, 1968

3,366,744

REMOTE TELEPHONE EXTENSION SYSTEM

Marvin Miller, Fairlawn, N.J., assignor to Sibany Corporation, Fairlawn, N.J., a corporation of New Jersey Filed Mar. 2, 1964, Ser. No. 348,395
8 Claims. (Cl. 179—41)

The present invention relates generally to communication systems and more specifically to a telephone extension system including a wireless radio frequency link between a fixed station connected to a conventional telephone line and a portable radio receiving and transmitting device which enables a person carrying the portable radio device to answer and receive telephone calls by remote control.

Present day land-line telephone systems are limited to fixed installation points, and as a consequence, subscribers have resorted to extensive use of wired telephone extensions within homes and business offices.

Radio-telephone extension links have been proposed in the prior art to permit a subscriber to answer calls to a fixed telephone station at remote points. These systems involve the use of relatively complex and bulky radio receiving and transmitting control equipment. Achieving reliable operation with these systems has been a great problem not only to the telephone subscriber but also to the telephone company's maintenance personnel.

It is a principal object of the present invention to provide an extremely simple but reliable radio-telephone extension device which will permit a subscriber to remotely receive and answer all telephone calls made to a fixed telephone installation by means of an extremely compact portable radio transmitter and receiver unit.

In accordance with the present invention, the incoming signals (including the ringing signal) received on a wired telephone system are supplied to a fixed radio-frequency transmitter in the user's home or office and arranged to modulate the carrier of that transmitter. A portable receiver or transceiver carried by the subscriber and tuned to the operating frequency of the home or office transmitter reproduces the ringing signal of an incoming call and alerts the subscriber that the call is being received on his telephone. The answering call spoken into the transmitter of the portable transceiver is detected by a fixed receiver in the user's home or office that is tuned to the transmitting frequency of the portable transceiver and either the output audio signal or the A.G.C. signal in the receiver is utilized to actuate a relay switch circuit adapted to either electrically or mechanically "pick up" the home or office telephone and effectively complete a resistive termination on the telephone line so as to indicate to the calling telephone and the central telephone switching system that the call circuit has been completed. At the same time, the audio frequency output signal from the fixed receiver is connected to the telephone line so that the answering voice of the subscriber is transmitted to the calling party.

In accordance with one embodiment of the invention, a relay switch circuit responsive to the R-F carrier signal from the answering transmitter or to the received answering voice signal is provided to electrically "pick up" the telephone and a control circuit is provided to maintain the telephone in that "picked up" condition. Additional circuitry, responsive to the incoming voice signals and the answering voice signals, is provided to return the telephone to the normal "hang up" condition if the pause following an incoming or answering voice signal exceeds in time a given number of seconds. In practice, the interval of time is adjusted so as to be longer in duration than the normal pauses occurring in conversations. In this manner, the called telephone will automatically hang up when the parties have completed their conversation, as indicated by the cessation of their voice signals. Thus in accordance with this featured aspect of the invention, hanging up the remotely answered telephone does not require special remote control signals to be transmitted by the subscriber from his portable transceiver. Since no special remote control signals are required, the portable transceiver need only transmit audio frequency voice signals, and may be of the simplest and most conventional design. Automatic hang up after a short period of time permits simplification of circuitry and removes the possibility that the user's telephone would remain "tied up" by a failure of the calling party to hang up his telephone.

In accordance with a second embodiment of the invention, electro-mechanical means are provided for operating the switch buttons normally actuated by picking up the telephone receiver unit from its rest position. This embodiment of the invention, which is controlled by circuits substantially the same as those generally described above, has the advantage that no physical electrical connections to the telephone equipment are required. Detection of the incoming ringing and voice signals and transmission of the answering voice signals may be provided by a conventional induction pick-up coil that is mounted adjacent to the induction coil in the remotely answered telephone. In the alternative, incoming voice and ringing signals may be detected by either a microphone or an inductive pick up mounted in close proximity to the telephone receiver, and answering voice signals may be coupled to the line by a small loudspeaker mounted near the telephone mouthpiece. The control circuits are substantially the same as those provided in the first embodiment except that the electrical "pick-up" relay is arranged to energize a solenoid device provided to release the switch buttons normally held depressed by the telephone receiver unit. This operation is provided in lieu of the electrical "pick-up" arrangement by which a resistive termination is placed across the telephone wires to indicate that the called telephone has been electrically picked up. This second embodiment is particularly useful in areas where telephone companies absolutely prohibit the direct attachment of any external electrical equipment to the companies' leased telephones and telephone lines.

The foregoing and other objects, features, and advantages of the invention will be apparent from the following more particular description of the preferred embodiments of the invention, as illustrated in the accompanying drawings in which.

Figure 1:
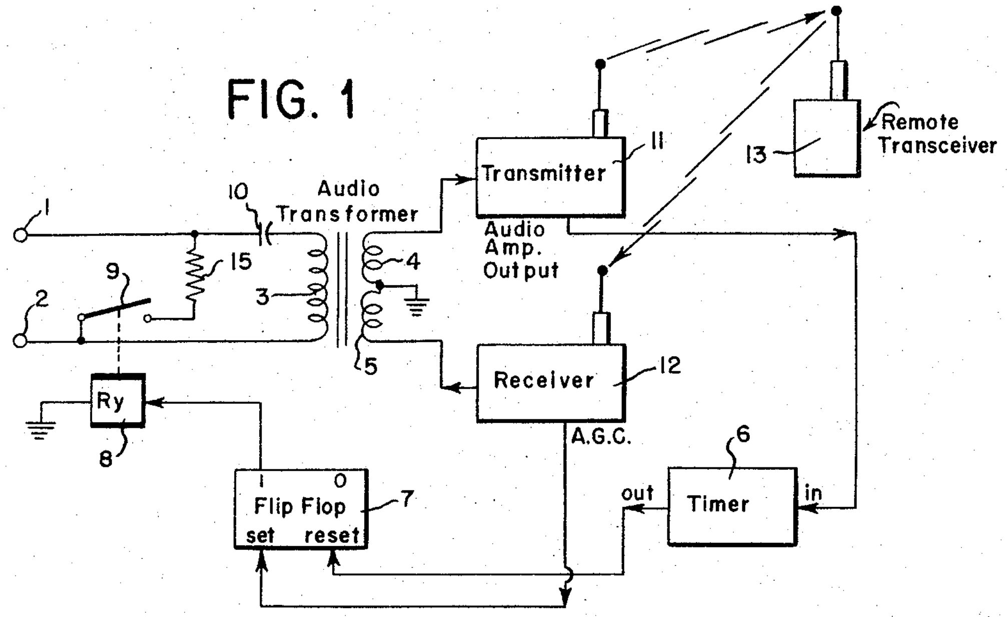
FIG. 1 is a block schematic diagram of one embodiment of portable remote answering telephone apparatus in accordance with the present invention.

Referring now to FIG. 1, there are shown input terminals 1 and 2 which are provided for connection to the incoming telephone line. The portable extension telephone system provided by the present invention including the control apparatus, radio frequency transmitter 11 and receiver 12 may be conveniently located in a fixed position adjacent to the incoming telephone line terminals. Portable transceiver 13, which is preferably a transistorized pocket-size unit, is provided for receiving incoming ringing and voice signals at remote points and for transmitting the answering response. Operation of the entire system will now be described in further detail.

In normal operation, 11 and 12 are electrically energized and transceiver unit 13 carried by the subscriber is turned on so that the receiver is capable of receiving all signals transmitted by 11. The radio-frequency units 11, 12, and 13, are conventional and may operate, for example, in the citizens' band using either AM or FM intelligence modulation techniques. The primary winding 3 of an audio transformer is connected across the input telephone terminals and a blocking capacitor 10 is provided to block the flow of D-C current through the primary winding 3. Incoming ringing and voice signals appearing on the called telephone line are supplied by means of a secondary winding 4 of the audio transformer to the audio modulation input terminals of transmitter 11. Transmitter 11 is preferably of the voice-operated type wherein the radio-frequency carrier is only generated in response to ringing or voice signals. Since such voice-operated transmitter circuits are well known in the art and since they form no part of this invention, circuit details will not be given here.

The transmitted ringing signal is received by unit 13, the receiving portion of which is tuned to the transmitting frequency of 11. Unit 13 may comprise separate receiver and transmitter units wherein the receiver might operate continuously. In any case, the operating frequency of the transmitter associated with 13 should preferably be different from the transmitting frequency of 11 so that receiver 12 can operate continuously to receive signals from 13 without interference from signals transmitted by 11. As indicated above, where compactness and portability are of prime concern, 13 may preferably be a transceiver. In the transceiver operation, the portable receiver portion is disabled and the transmitter circuitry is enabled by depressing a push-to-talk button on 13. The answering call is then transmitted by unit 13 and received by 12. The audio output signal from receiver 12 or the receiver's A.G.C. voltage is supplied to the "set" terminal of a flip-flop 7. Unit 7 is a bi-stable circuit capable of being "set" to a "1" state and "reset" to a "0" state when a signal voltage is supplied to its "set" and "reset" terminals, respectively. When the flip-flop is in the "1" state, its "1 OUT" terminal is energized and its "0 OUT" terminal is not energized. When the flip-flop is in the "0" state, its "1 OUT" terminal is not energized and its "0 OUT" terminal is energized. Such flip-flop circuits are well known in the art and the internal circuitry of 7 will not be described here. The answering voice signal from 13, received by 12 sets flip-flop 7 to its "1" state and causes SPST relay 8, the coil of which is connected to the "1 OUT" terminal of 7, to be energized. When relay 8 is energized, switch contact 9 is closed and a resistive termination 15 is connected across the telephone line terminals. The resistive termination across the line halts the ringing signal generator at the central telephone office, completes the interconnection of the caller's telephone with the called telephone and effectively functions to electrically "pick up" the local telephone receiver. The resistive termination 15 remains across the line as long as flip-flop 7 is in its "1" state and is removed only when 7 is reset to a "0" state.

The answering audio-frequency voice signals transmitted from 13 and received by 12 are also supplied to a secondary winding 5 on the audio transformer and by means of the primary winding 3 of the audio transformer they are impressed on the telephone line and so transmitted to the calling party. The secondary winding 4 is excited not only by incoming ringing and voice signals on the telephone line but also by the answering voice signals impressed on the line. As a consequence, transmitter 11 transmits both sides of a conversation. The audio amplifier output of 11, responding to both incoming and answering voice signals, is connected to the input of a timer device 6. The nature of the timer device 6 is such that a given period of time (e.g. 20 seconds) after receiving an input signal, the timer will emit an output signal from its output terminal unless a new input signal has been received by it before then, in which case the timer starts counting the period of time from the reception of the new input signal. Circuit techniques to perform such a function are well known in the art. One form of the timer device might utilize the charging of a capacitor through a resistance, the value of the components being such that the voltage across the capacitor after the desired interval of time is sufficient to trigger an output pulse generator. The presence of input signals to the timer would be arranged to discharge the capacitor and thus restore the timing operation.

If there has been no conversation from either party for the period of time (e.g. 20 seconds) set in the timer device, the timer will produce a reset output signal. On the occurrence of this signal, the flip-flop 7 will be reset to its "0" state, and the relay 8 will be de-energized, removing the resistive termination 15 from the telephone line and electrically "hanging-up" the called telephone.

The interval of time set in the timer device 6 should be shorter than the period of time between the hanging up of the caller's telephone and the appearance of a dial tone signal on the line so that the called telephone will have the opportunity to electrically hang up in that period.

Figures 2, 3:
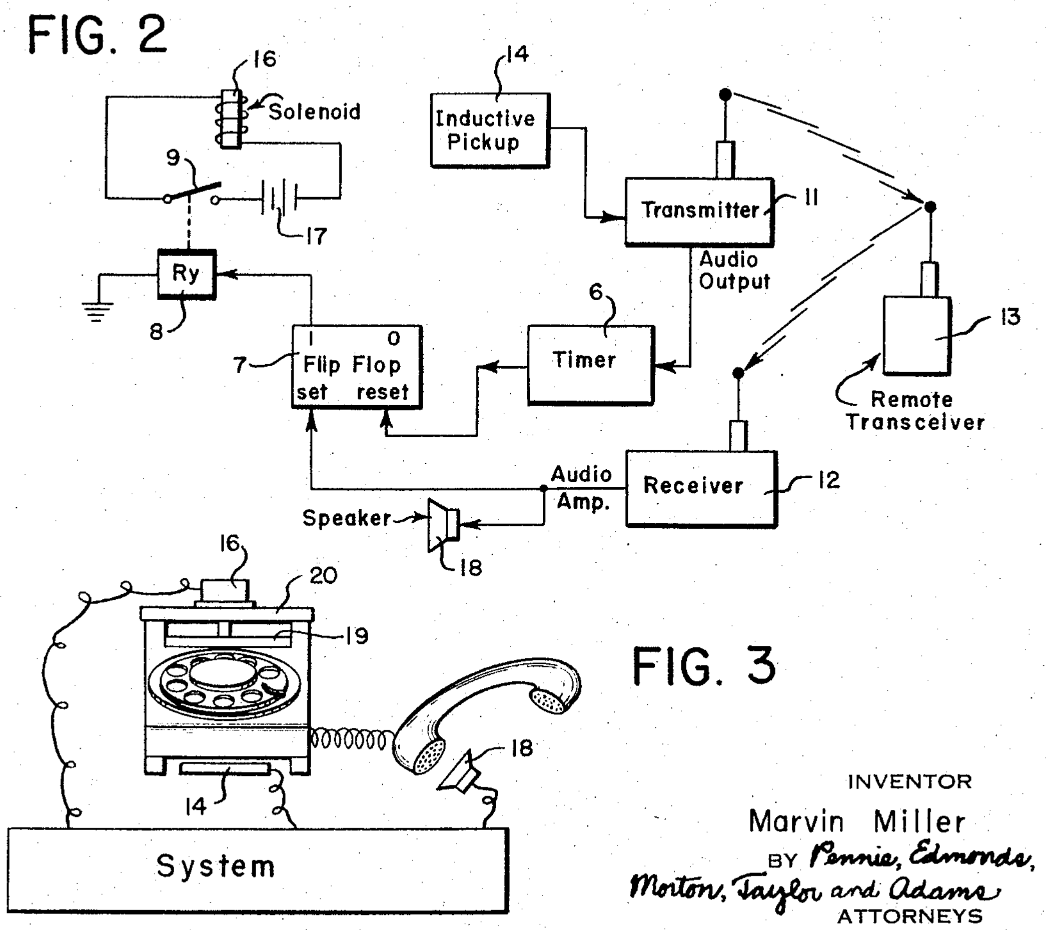
FIG. 2 is a block diagram of a second embodiment of the invention.
FIG. 3 is a drawing illustrating physical arrangements of units within the second embodiment of the invention.

In the second embodiment of the invention, illustrated in FIGS. 2 and 3, the apparatus is modified so that physical electrical circuit connections to the incoming telephone lines are completely avoided. An induction pick-up coil 14, preferably mounted adjacent to the induction coil in the telephone, is provided to detect the incoming ringing and voice signals and answering voice signals and transmit these voice signals to the remotely located transceiver 13. The answering voice signals from 13 as received by 12 are supplied to a loudspeaker 18 adjacent to the telephone mouthpiece and in this way signal transmission to and from the telephone is effected without any physical electrical contacts being made to the telephone equipment.

In this embodiment of the invention, physical pick-up of the subscriber's telephone is effected by electrical energization of solenoid 16 as shown in FIGS. 2 and 3. Contacts 9 of relay 8 are arranged to energize 16 with battery 17 when relay 8 is activated. The remaining control circuitry functions as described in the first embodiment.

Solenoid 16 is mechanically mounted on a dummy headpiece 20 and the armature of 16 is connected to member 19 as shown in FIG. 3. The normal telephone receiver is removed from its resting cradle and 20 is mounted in its place. The weight of 16 and 19 is sufficient to depress the telephone switch buttons in the same manner as the normal receiver unit does when it is in its normal resting position. When solenoid 16 is electrically energized in response to an answering voice signal from the remote transceiver 13, the movable solenoid armature is extended and member 19 is elevated enough to release the switch buttons. In this manner, the telephone is effectvely remotely picked up in response to an incoming call by control circuits which are in no way physically connected to the electrical circuits of the telephone line or telephone equipment.

When relay 8 is de-energized following a sufficient time pause in the telephone conversation, switch contacts 9 are opened and solenoid 16 is de-energized. Member 19 then falls back and depresses the switch buttons thereby effectively hanging up the telephone. In all other respects, the operation of the second embodiment of the invention illustrated in FIGS. 2 and 3 is the same as that described for FIG. 1.

It will be seen that the applicant's invention provides an extremely simple and reliable remote answering telephone system with a minimum of operating components, both at the telephone site and in the remote portable radio transmitters and receiving devices.

While the invention has been particularly shown and described with reference to preferred embodiments thereof, it will be understood by those skilled in the art that various changes in form and details may be made therein without departing from the spirit and scope of the invention.

I claim:

1. Apparatus adapted to pick up the incoming ringing and voice signals from a called telephone and to transmit to the calling telephone the answering voice signal from a remotely located portable radio-frequency answering station, said apparatus comprising:

(a) a portable radio-frequency answering station including a first receiver and a first transmitter;

(b) a fixed radio-frequency station associated with said telephone, including a second transmitter provided to transmit said incoming ringing and voice signals for reception by said first receiver and a second receiver for receiving and supplying to an output line the answering voice signals transmitted by said first transmitter;

(c) first circuit means responsive to the answering voice signal from said second receiver provided to operatively place a resistive termination across the called telephone line and to electrically couple said output line thereto; and (d) timer circuit means responsive to said incoming voice signals and said answering voice signals for removing the resistive termination from the called telephone line and for uncoupling from said line the output line for supplying the answering voice signals from said second receiver after a predetermined interval of time has elapsed following the cessation of said incoming and answering voice signals.

2. Apparatus adapted to electrically terminate with a line holding resistance the line of a called telephone in response to an answering electrical voice signal and to automatically disconnect said resistance from the line, said apparatus comprising:

(a) first circuit means operatively responsive to said answering electrical voice signal provided to place a resistive termination across the called telephone line and to electrically couple thereto an output line supplying an answering voice signal; and (b) second circuit means responsive to voice signals transmitted and received over the called telephone line provided to remove the resistive termination from said line and to uncouple therefrom the output line for supplying the answering voice signal a predetermined interval of time after the cessation of the voice signals transmitted over said line.

3. Apparatus adapted to electrically connect a called telephone to a calling line in response to an answering electrical voice signal and to automatically disconnect said called telephone, said apparatus comprising:

(a) an electromechanical dummy receiver adapted to be mounted on a telephone cradle support in place of the normal telephone headpiece, said dummy receiver including electrically energizable solenoid means mounted thereon for lifting said dummy receiver from said cradle;

(b) first circuit means operatively responsive to said answering electrical voice signal provided to electrically energize said solenoid means; and (c) second circuit means responsive to electrical voice signals transmitted and received over the called telephone line provided to electrically de-energize said solenoid a predetermined interval of time after the cessation of said electrical voice signals transmitted and received over said line.

4. Apparatus adapted to pick up the incoming ringing and voice signals to a called telephone and to transmit to the calling telephone the answering voice signal from a remotely located portable radio-frequency answering station, said apparatus comprising:

(a) a portable radio-frequency answering station including a first receiver and a first transmitter;

(b) a fixed radio-frequency station associated with said telephone including a second transmitter provided to transmit said incoming ringing and voice signals for reception by said first receiver and a second receiver for receiving and supplying to an output line the answering voice signals transmitted by said first transmitter;

(c) an electromechanical dummy receiver adapted to be mounted on a telephone cradle support in place of the normal telephone headpiece, said dummy receiver including electrically energizable solenoid means mounted thereon for lifting said dummy receiver from said cradle;

(d) first circuit means operatively responsive to the answering voice signal from said second receiver provided to electrically energize said solenoid means; and (e) second circuit means responsive to said incoming voice signals and said answering voice signals provided to electrically de-energize said solenoid a predetermined interval of time after the cessation of said electrical voice signals transmitted and received over said line.

5. Apparatus adapted to be connected to a conventional dial telephone system to automatically electrically terminate with a line holding resistance the line of a called telephone in response to an answering electrical voice signal supplied on an output line and to automatically disconnect said called telephone, said apparatus comprising:

(a) first relay switch means operatively responsive to said answering electrical voice signal provided to electrically connect a resistive termination across the called telephone line and to electrically connect thereto the answering voice signal output line; and (b) second relay switch means responsive to electrical voice signals appearing on the called telephone line provided to electrically disconnect the resistive termination from said line and to electrically disconnect therefrom the answering voice signal output line a predetermined interval of time after the completion of the most recent of said electrical voice signals appearing on said line.

6. Apparatus adapted to pick up the incoming ringing and voice signals from a called telephone and to transmit to the calling telephone the answering voice signal from a remotely located portable carrier-frequency answering station, said apparatus comprising:

(a) a portable carrier-frequency answering station including a first receiver and first transmitter;

(b) a fixed carrier-frequency station associated with said telephone including a second transmitter provided to transmit said incoming ringing and voice signals for reception by said first receiver and a second receiver for receiving and supplying to an output line the answering voice signals transmitted by said first carrier transmitter;

(c) first circuit means responsive to the detected carrier signal from said second receiver provided to operatively place a resistive termination across the called telephone line and to electrically couple the output line voice signals thereto; and (d) second circuit means responsive to electrical voice signals transmitted and received over the called telephone line provided to electrically disconnect the resistive termination from said line and to electrically disconnect the output line for supplying answering voice signal therefrom a predetermined interval of time after the cessation of said electrical voice signals transmitted and received over said line.

7. Apparatus adapted to pick up the incoming ringing and voice signals from a called telephone and to transmit to the calling telephone the answering voice signal from a remotely located portable answering station, said apparatus comprising:

(a) a portable answering station including a first receiver of electromagnetic radiation and a first transmitter of electromagnetic radiation;

(b) a fixed station associated with said telephone, including a second transmitter of electromagnetic radiation provided to transmit said incoming ringing and voice signals for reception by said first receiver and a second receiver of electromagnetic radiation for receiving and supplying to an output line the answering voice signals transmitted by said first transmitter;

(c) first circuit means responsive to the answering voice signal from said second receiver provided to operatively place a resistive termination across the called telephone line and to electrically couple said output line voice signals thereto; and (d) timer circuit means responsive to said incoming voice signals and said answering voice signals for removing the resistive termination from the called telephone line and for uncoupling from said line the output line for supplying answering voice signals from said second receiver after a predetermined interval of time has elapsed following the cessation of said incoming and answering voice signals.

8. Apparatus adapted to pick up the incoming ringing and voice signals to a called telephone having a microphone and to transmit to the calling telephone the answering voice signal from a remotely located portable answering station, said apparatus comprising:

(a) a portable answering station including a first receiver of electromagnetic radiation and a first transmitter of electromagnetic radiation;

(b) a fixed station associated with said telephone including a second transmitter of electromagnetic radiation provided to transmit said incoming ringing and voice signals for reception by said first receiver and a second receiver of electromagnetic radiation for receiving the answering voice signals transmitted by said first transmitter;

(c) an electromechanical dummy receiver adapted to be mounted on a telephone cradle support in place of the normal telephone headpiece, said dummy receiver including electrically energizable solenoid means mounted thereon for lifting said dummy receiver from said cradle;

(d) first circuit means operatively responsive to the answering voice signal from said second receiver provided to electrically energize said solenoid means and to acoustically couple the answering voice signal from said second receiver to the telephone microphone whereby the answering voice signal is electrically coupled to the called telephone line; and (e) second circuit means responsive to said incoming voice signals and said answering voice signals provided to electrically de-energize said solenoid a predetermined interval of time after the cessation of said electrical voice signals transmitted and received over said line.

References Cited

UNITED STATES PATENTS

| | | | |
|---|---|---|---|
| 2,488,153 | 11/1949 | Wiener | 343—177 |
| 2,608,608 | 8/1952 | Handschin | 179—84 X |
| 2,864,889 | 12/1958 | O'Dwyer et al. | 179—6 |
| 2,946,852 | 7/1960 | Brown et al. | 179—1 X |
| 3,254,159 | 5/1966 | Condict | 179—41 |
| 2,894,121 | 7/1959 | Phillips | 325—64 |
| 2,935,605 | 5/1960 | Mathieu | 325—64 X |
| 3,100,818 | 8/1963 | Carter | 179—1 |
| 3,193,623 | 7/1965 | Burns et al. | 179—41 |
| 3,198,888 | 8/1965 | Lemelson | 179—41 |
| 3,041,411 | 6/1962 | Beatty | 179—81 |
| 3,124,657 | 3/1964 | Peterson | 179—81 |

WILLIAM C. COOPER, *Primary Examiner.*

JOHN W. CALDWELL, *Examiner.*

KATHLEEN H. CLAFFY, *Assistant Examiner.*